United States Patent [19]

Clarke

[11] Patent Number: 5,200,659

[45] Date of Patent: Apr. 6, 1993

[54] AXIAL AND RADIAL FIELD ELECTRIC ROTATING MACHINES HAVING RELATIVELY ROTATABLE FIRST AND SECOND STATORS

[76] Inventor: Patrick W. Clarke, 244 Sagamore Dr., Murray Hill, N.J. 07974

[21] Appl. No.: 763,955

[22] Filed: Sep. 23, 1991

Related U.S. Application Data

[63] Continuation-in-part of Ser. No. 462,059, Jan. 8, 1990, abandoned.

[51] Int. Cl.$^5$ .................... H02K 21/04; H02K 23/02; H02K 1/12
[52] U.S. Cl. .................... 310/112; 310/181; 310/254
[58] Field of Search .............. 307/44; 310/112, 114, 310/115, 116, 181, 254, 126, 118, 170; 318/539, 727; 322/46

[56] References Cited

U.S. PATENT DOCUMENTS

| Re. 12,793 | 5/1908 | Wells, Jr. | 307/47 |
| 977,328 | 11/1910 | Richter | 307/47 |
| 996,762 | 4/1911 | Hertwig et al. | 307/47 |
| 1,014,373 | 1/1912 | Bijur | 307/47 |
| 1,139,294 | 5/1915 | Johnson | 307/47 |
| 1,246,643 | 11/1917 | Neuland | 290/5 |
| 1,708,909 | 4/1929 | Spencer | 310/212 |
| 2,871,438 | 1/1959 | Annis | 322/13 |
| 3,242,365 | 3/1966 | Kober | 310/191 |
| 3,280,400 | 10/1966 | Roe | 318/243 |
| 3,290,574 | 12/1966 | Roe | 318/214 |
| 3,405,296 | 10/1968 | Stilley et al. | 310/116 |
| 3,435,315 | 3/1969 | Kordik et al. | 318/239 |
| 3,586,938 | 6/1971 | Le Gall | 318/166 |
| 3,940,668 | 2/1976 | Apsit et al. | 318/226 |
| 4,087,698 | 5/1978 | Myers | 307/84 |
| 4,177,414 | 12/1979 | Roesel, Jr. et al. | 322/28 |
| 4,228,391 | 10/1980 | Owen | 322/35 |
| 4,229,689 | 10/1980 | Nickoladze | 322/32 |
| 4,525,661 | 6/1985 | Mucsy et al. | 322/4 |
| 4,686,375 | 8/1987 | Gottfried | 290/2 |
| 4,785,213 | 11/1988 | Satake | 310/116 |
| 4,879,484 | 11/1989 | Huss | 310/114 |
| 4,920,293 | 4/1990 | Kanda | 310/116 |
| 4,945,296 | 7/1990 | Satake | 310/116 |
| 4,959,578 | 9/1990 | Varga | 310/114 |
| 5,051,639 | 9/1991 | Satake et al. | 310/112 |
| 5,068,559 | 11/1991 | Satake et al. | 310/112 |

FOREIGN PATENT DOCUMENTS

| 27-4357 | 10/1957 | Japan | 310/114 |
| 49-86807 | 8/1974 | Japan | 310/114 |
| 54-29005 | 3/1979 | Japan . |
| 59-191461 | 10/1984 | Japan . |
| 62-260590 | 11/1987 | Japan . |

Primary Examiner—Steven L. Stephan
Assistant Examiner—D. R. Haszko
Attorney, Agent, or Firm—Weingarten, Schurgin, Gagnebin & Hayes

[57] ABSTRACT

An adjustable speed drive system is provided which employs a unique induction machine which includes a rotor assembly mounted on a shaft, and associated cooperative first and second stators. The two stators are angularly adjustable, relative to each other, about the axis of the shaft. The net excitation of the rotor and thus the operating point of the machine on the torque-speed curve of a load on the shaft of the machine is a function of the relative angular displacement of the two stators. A third stator may be employed to enhance the efficiency of the machine by feeding excess rotor power back into the power line.

18 Claims, 8 Drawing Sheets

AXIAL AND RADIAL FIELD ELECTRIC ROTATING MACHINES HAVING RELATIVELY ROTATABLE FIRST AND SECOND STATORS

RELATED APPLICATION

This application is a continuation-in-part of application Ser. No. 07/462,059, filed Jan. 8, 1990 now abandoned.

FIELD OF THE INVENTION

This invention relates to electrical adjustable speed drives and more particularly to electrical adjustable speed drives operating on alternating current.

BACKGROUND OF THE INVENTION

Induction motors are widely employed for a variety of applications and are available in a wide range of capacities, from fractional horsepower to multiple horsepower sizes. The speed of such motors cannot be efficiently reduced by lowering the applied voltage. This is because, when the speed is reduced, the stator and rotor currents substantially increase and the power factor substantially decreases. This results in a significant loss in motor efficiency, with damage to the motor possible by reason of the increased currents and consequent increased temperature due to increased ohmic losses. The increase in ohmic losses in a conventional induction motor, occasioned by reduced input voltage and thus reduced speed, can become so large as to render continuous operation impractical. Therefore, other methods have been developed to vary the speed of an induction motor.

Figure 1:
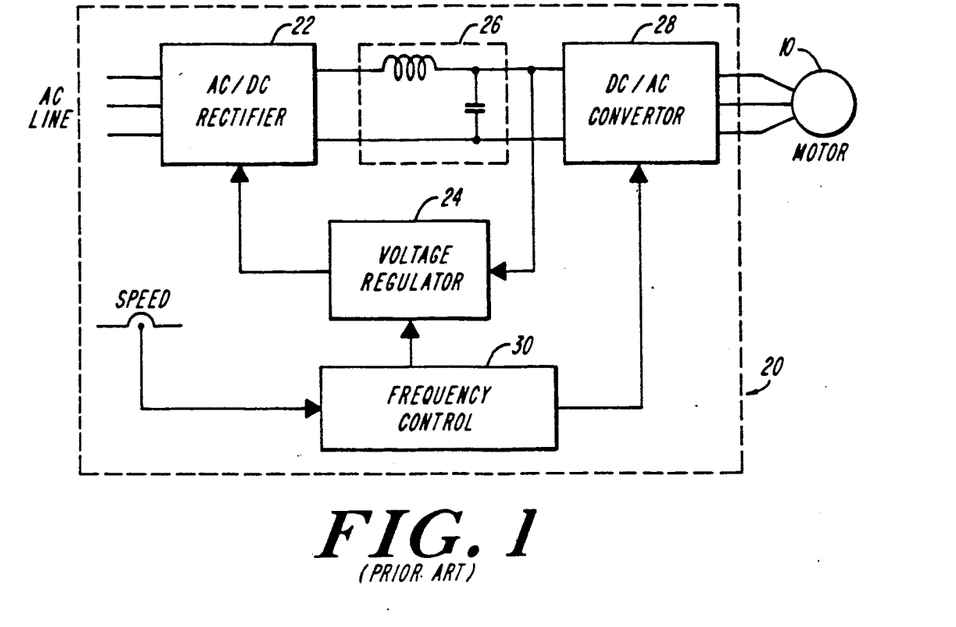
FIG. 1 is a block diagram of a conventional ASD known to the prior art.

One such conventional method is shown in FIG. 1. In FIG. 1, the speed of an induction motor 10 is controlled by an adjustable speed drive (ASD) 20 which includes an ac to dc rectifier 22, voltage regulator 24 and filter 26 which supply dc power to a dc to ac converter 28. The voltage and frequency output of the dc to ac converter 28 is controlled by a frequency controller 30 and drives the motor 10 at a speed related to the voltage and frequency of output of the dc to ac converter 28. This conventional adjustable speed drive (ASD) 20 not only requires electronic circuitry for providing the ac to dc rectification, filtering and the dc to ac conversion, but also for voltage regulation and frequency control.

A drawback of such an ASD system is that it typically generates harmonic currents which are not desirable and which can adversely affect the ac line supply. Further, such ASD systems are also sensitive to transients and surge voltages which can exist on the ac power supply line.

It is therefore advantageous to provide means for controlling the speed of an induction motor without the need for the relatively complex and sensitive electronics for varying the applied voltage and frequency.

SUMMARY OF THE INVENTION

In accordance with the invention, an adjustable speed drive system is provided which employs a unique induction machine including means for providing a first rotating field, means for providing a second field synchronously rotating with the first field, means for adjusting the angular displacement between the first and second fields and means for coupling the first and second fields to an induction rotor so as to adjust the operating point of the machine on the torque-speed curve of a load on its shaft. The speed of the rotor is directly related to the angular displacement between the first and second fields.

The machine may be connected to the ac main power line by means of a voltage controller which is operative to adjust the input voltage to provide a unity or other intended power factor. Such a system, which includes an induction machine and voltage controller, is immune to line voltage surges and transients and provides unity power factor operation over the full operational speed range. The system also has extremely low harmonic input current and does not employ any power semiconductors in the main power path. The system is more efficient than conventional adjustable speed drives, can be made less expensively and can be smaller and lighter than conventional systems.

In one aspect of the invention, the induction machine includes a rotor assembly which is cooperative with first and second stators. At least one of the stators is angularly adjustable about the axis of the rotor in relation to the other stator, as described in the above-described embodiment. The stator windings are preferably, but not necessarily, identical; are connected in parallel or in series to an ac source; and are operative to energize respective halves of the common rotor. The voltages in the rotor induced by the respective stators are at a phase angle, in relation to each other, which is a function of the angular position between the stators. The operating point of the machine along the torque-speed curve of a load on its shaft, and thus its speed, are a function of the angular position between the stators.

In another aspect, the induction machine includes a third stator connected in parallel with the two stator input windings. The third stator may be adjustable in angular position relative to the other stator windings and prevents otherwise excessive rotor current, which attends reduced speeds, by feeding excess rotor power back into the power source.

Power factor correction is preferably provided by an inductor which couples the machine to an ac source. Alternatively, power factor correction may be accomplished by replacing the inductor with an autotransformer. The output voltage of the autotransformer is adjustable to provide an intended input voltage to the induction machine so as to provide unity power factor over the full operational range of the machine. Power factor correction can be automatically maintained by an appropriate control loop. Alternatively, power factor correction can be provided by conventional capacitor correction or by a tapped stator winding to provide a desired input voltage so as to achieve unity or other intended power factor.

A start circuit can also be provided for starting the induction machine prior to the initial application of ac power using any of the techniques known to the art. The rotor structure can be of a squirrel cage or wound form. The stator windings may be constructed, by techniques known to the art, to produce the required voltages and waveforms.

BRIEF DESCRIPTION OF THE DRAWING

These and further features of the invention may be understood with reference to the accompanying specification and drawing in which.

DETAILED DESCRIPTION

Figure 2:
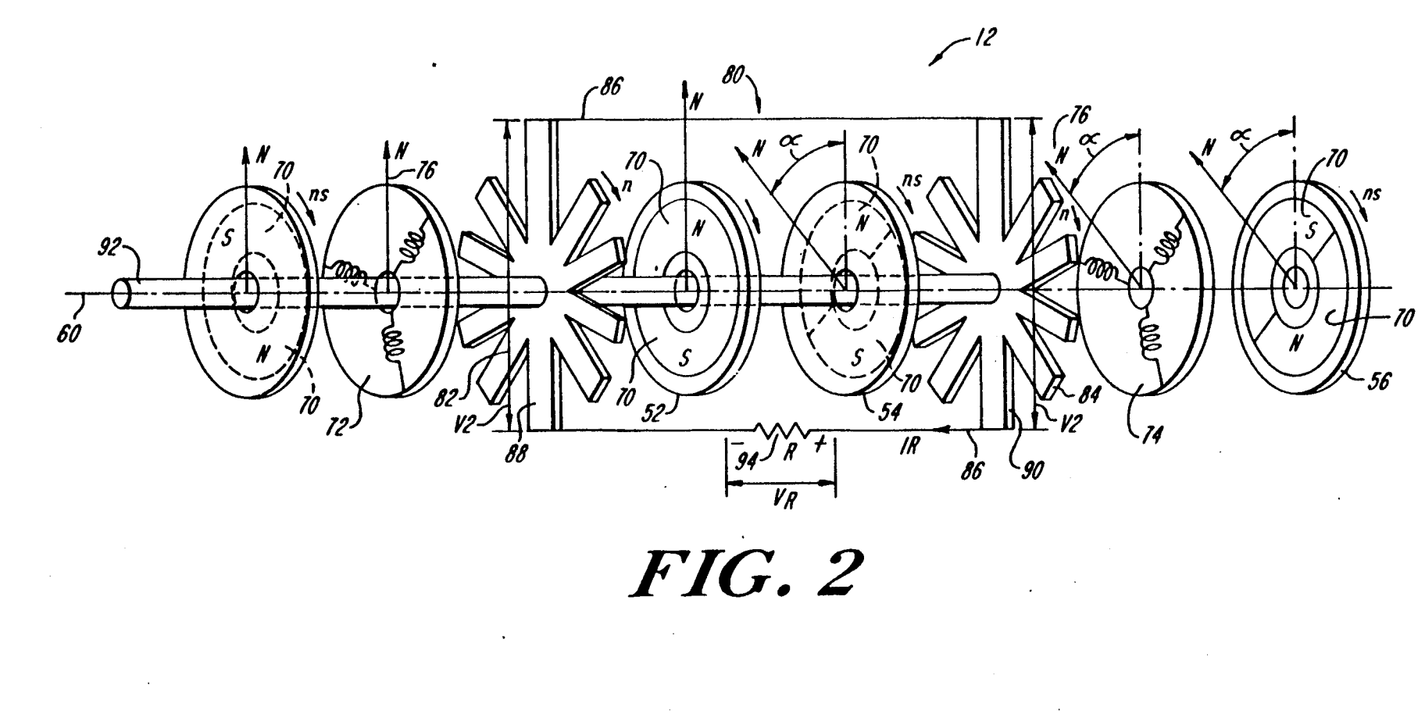
FIG. 2 is an exploded diagrammatic view of an embodiment of the invention.

An embodiment of a novel split stator permanent magnet squirrel cage machine in accordance with the invention is shown in FIG. 2 in an exploded perspective form. Field plates 50, 52, 54 and 56 are disposed along, and are each freely rotatable about, a shaft 92. Each of the field plates 50, 52, 54, 56 has a plurality of magnets 70 on its face with polarizations providing an axial field between the pairs of field plates and 52; and 54 and 56. That is, an axial field exists between plates 50 and 52 and between plates 54 and 56. The field plates 50, 52, 54, 56 are of sufficient thickness that the magnetic flux is contained within the respective axial air gaps between each pair of plates. The fields in the air gaps between the field plates 50 and 52, and 54 and 56 are of sufficient strength that the field plates within each pair remain accurately aligned in angular orientation with one another at all times. However, a minimal magnetic field exists between field plates 52 and 54 18 and thus the magnetically coupled pairs, 50 and 52, and 54 and 56 can freely rotate with respect to one another.

Figure 3:
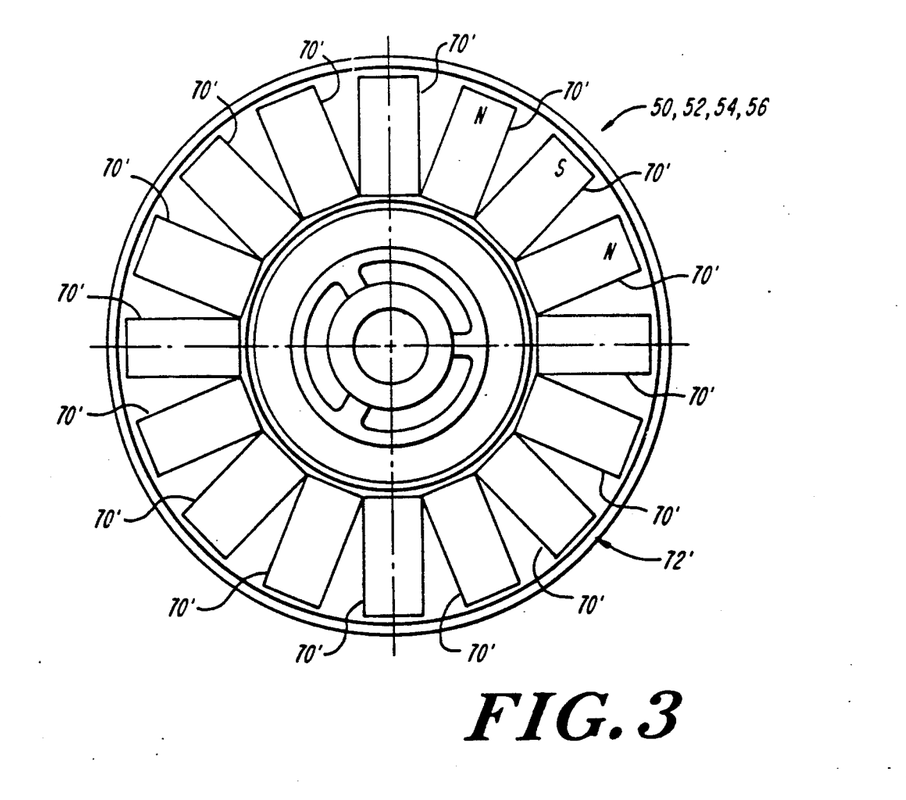
FIG. 3 is a plan view of a field plate of the embodiment of FIG. 2.

An example of a field plate 50, 52, 54, 56 having sixteen magnets is shown in FIG. 3. Each of the field plates 50, 52, 54, 56, comprises a soft steel disc 72' on which rare earth permanent magnets 70, are circumferentially mounted. The magnets 70' are magnetized on their face and may be arranged to provide a sinusoidal flux pattern. The disc 72' is sufficiently thick to conduct flux within the plates 50, 52, 54, 56, and therefore two plates 52 and 54, mounted back to back, will experience no significant field from one another.

Referring again to FIG. 2, a first stator input winding 72 is disposed along shaft 92 between field plates 50 and 52, and a second stator input winding 74 is disposed along shaft 92 between field plates 54 and 56. In this embodiment, the first stator input winding 72 has a predetermined angular orientation about the common shaft 92, while the second stator input winding 74 is adjustable in angular orientation about the common shaft 92 relative to the first stator input winding 72. The relative angular position of the first stator input winding 72 as determined, for example by the generated magnetic vector 76, with respect to the second stator input winding 74, again as determined by the generated magnetic vector 76, is designated by the symbol $\alpha$.

A squirrel cage rotor 80 includes a first radially spoked wheel 82 disposed between first stator input winding 72 and field plate 52 and a second radially spoked wheel 84 disposed between second stator input winding 74 and field plate 54. These radially spoked wheels 82, 84 are fixed to the shaft 92 and are electrically connected to each other by axial shorting bars, a single pair 86 of which is illustrated. The equivalent resistance of the circuit comprising spokes 88 and 90 and shorting bars 86 is shown in FIG. 2 as R 94. The shaft 92 of the rotor 80 is thus coaxial with the axis of rotation of the field plates 50, 52, 54, 56, and with the split stator input windings 72 and 74.

Figure 4:
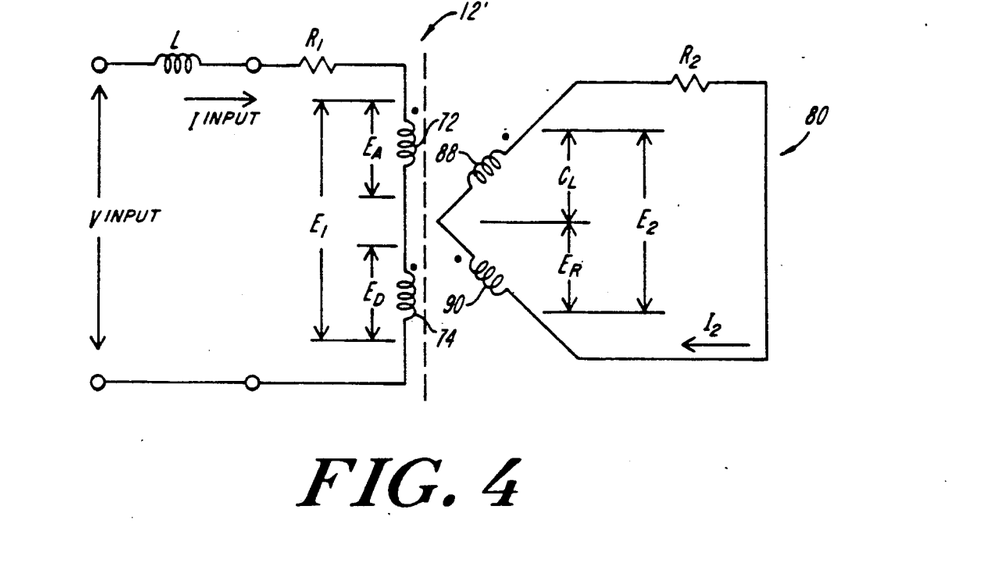
FIG. 4 is a schematic equivalent circuit diagram of the embodiment of FIG. 2 in which the windings are connected in series.
Figure 5:
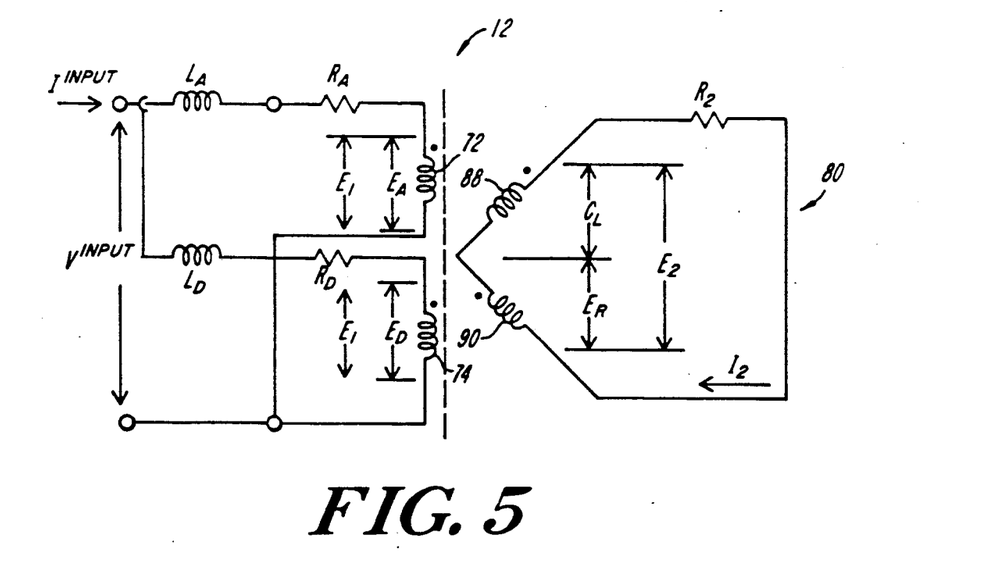
FIG. 5 is a schematic equivalent circuit diagram of the embodiment of FIG. 2 in which the windings are connected in parallel.

In operation, the split stator input windings 72 and 74 are energized from a suitable ac source. Referring also to FIGS. 4 and 5, the stator input windings 72, 74 may be connected in series (FIG. 4) or in parallel (FIG. 5) as desired to suit the voltage levels and parameters of a particular machine.

Stator input winding 72 generates an axial magnetic field rotating at synchronous speed in the air gap between field plate 50 and field plate 52, and the field plates 50 and 52 track the generated field as it rotates about the axis 60 of the common shaft 92. The generated field rotates around the axis 60 at a speed which is proportional to the line frequency of the voltage supplied to input winding 72. Thus, the field plates 50, 52 rotate about the axis 60 synchronously with the generated field as in a conventional permanent magnet synchronous motor. In a similar manner, the field plates 54 and 56 track the generated field of stator input winding 74. The phase angle of the field generated by the stator input winding 74 with respect to that generated by the stator input winding 72 can be adjusted by physically rotating the stator input winding 74 about the axis 60, through an angle $\alpha$.

Field plates 50 and 52 rotating past the interposed conductive spoke 88 of the rotor 80 induce a voltage V1 between the ends of the bar 88. Similarly, field plates 54 and 56 rotating past the interposed conductive spoke 90 of the rotor 80 induce a voltage V2 between the ends of the bar 90. The voltages V1 and V2 induced in the conductive spokes 88, 90 at the respective ends of the squirrel cage winding of the rotor 80 are out of phase by an amount directly related to the rotational displacement $\alpha$ of stator input winding 74 relative to the stator input winding 72.

The resulting rotor voltage $V_R$, across the equivalent resistor R 94, is equal to the vector sum of the induced voltages V1 and V2. The resulting current flow $I_R$ in the spokes 88, 90 interacting with the air gap fields generates a torque in the direction of field rotation as in a conventional induction motor. The speed of rotation of the squirrel cage and of the shaft to which it is affixed must be less than that of the generated magnetic field because voltage, current and torque generation in the rotor depends upon the speed difference, as in a conventional induction motor.

Figure 6:
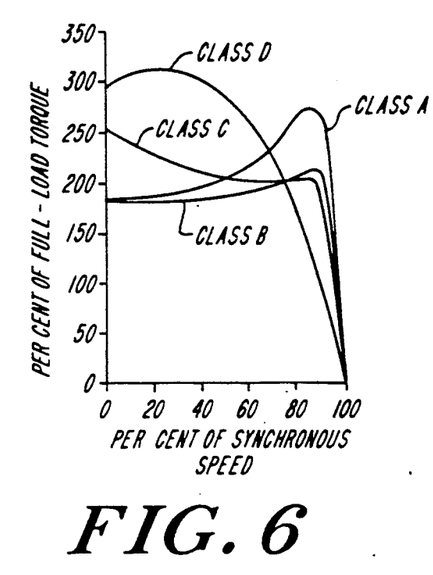
FIG. 6 is a diagram of torque-speed curves for induction machines.

Thus the resultant excitation of the rotor 80 can be varied by varying the angle $\alpha$. As is well known, the resistance and reactance of the rotor define the shape of the torque-speed curve of an induction motor. FIG. 6 shows typical torque-speed curves for various classes of induction motors. Again, as is well known, the excitation of the rotor determines the scale of the torque-speed curve along the torque axis. Thus in this machine, the design parameters of the rotor and the angle $\alpha$, along with the torque-speed characteristics of the load on the shaft 92, determine the torque and speed at which the machine operates. By varying the angle α the operating point can be varied over the full range of torques and speeds.

It should also be noted that for this device, the input current waveform can be similar to input currents for conventional motors and thus low levels of harmonic currents can be achieved. Additionally, since the air gap flux is supplied, in the illustrated embodiment, by permanent magnets, the excitation currents are very low. It should also be noted that external inductors may be added as necessary to provide the desired impedance as viewed from the power line.

Figure 7:
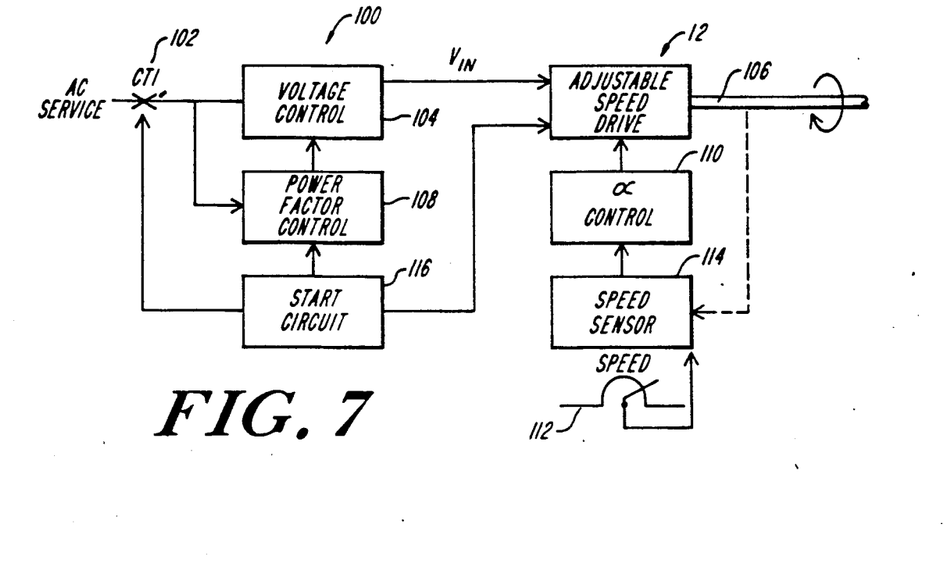
FIG. 7 is a block diagram of a controller for the embodiment of the invention shown in FIG. 2.

An adjustable speed drive system constructed in accordance with the invention is shown in FIG. 7. An AC voltage is applied via a contactor CT1 102 to a voltage controller 104. The output of the voltage controller is the input voltage, $V_{input}$, to the split stator machine 12 of the invention. The output shaft 106 of the machine 12 rotates at a speed which is to be adjustably controlled. A power factor control circuit 108 is also connected to the input voltage and provides control signals to the voltage controller 104. The control signals cause the voltage controller 104 to provide a voltage, $V_{input}$, in accordance with input power parameters, to maintain a unity or other intended power factor.

A speed controller 110 receives a selected speed signal from a speed selector 112 and adjusts the relative angle α of the first and second stators to produce the desired shaft speed. A speed sensor 114 can be provided to monitor the actual rotational speed of the rotor shaft 106 and to provide feedback signals to the speed controller 112 to maintain an intended shaft speed.

During the startup of the system, the contactor CT1 102 is open to disconnect the system from the AC input and a start circuit 116 energizes the machine 12 by spinning the field plates up to a synchronous speed with respect to the ac line voltage. Known brushless drive circuitry can be used in the startup sequence to perform this function. Once the field plates have achieved synchronous speed, the contactor CT1 102 is closed to connect the system to the AC power source.

The voltage controller 104 can, in one embodiment, be an autotransformer. The AC input voltage is applied to the autotransformer and the output of the autotransformer is the voltage, $V_{input}$, applied to the split stator machine 12. Alternatively, adjustment of the input voltage to the machine 12 can also be provided by tapped stator windings; the taps of which can be adjusted to provide the intended input voltage to achieve unity or other intended power factor operation. Power factor correction also can be accomplished using capacitors which are conventionally known for power factor correction.

Figure 8:
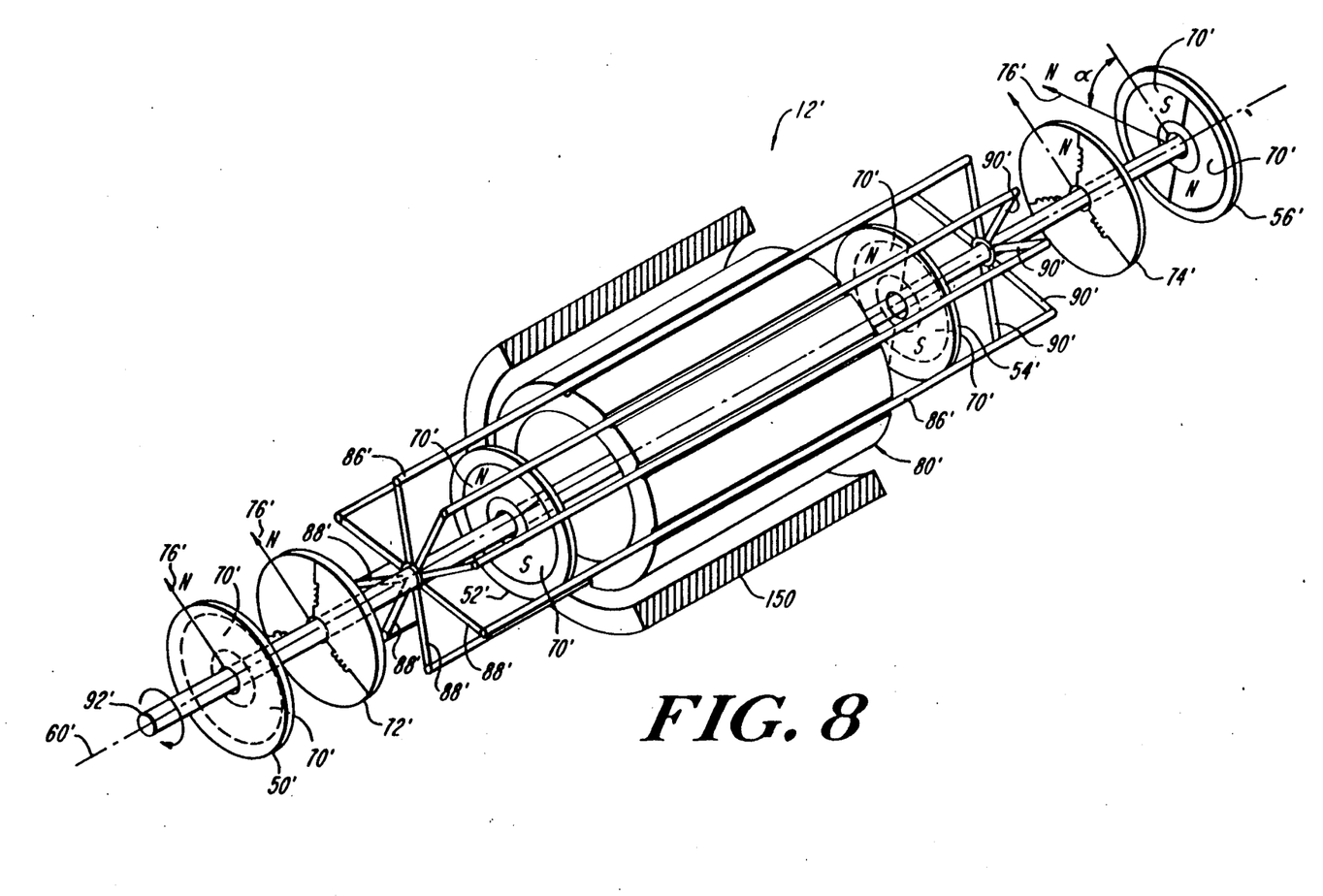
FIG. 8 is an exploded diagrammatic view of another embodiment of the invention.
Figure 9:
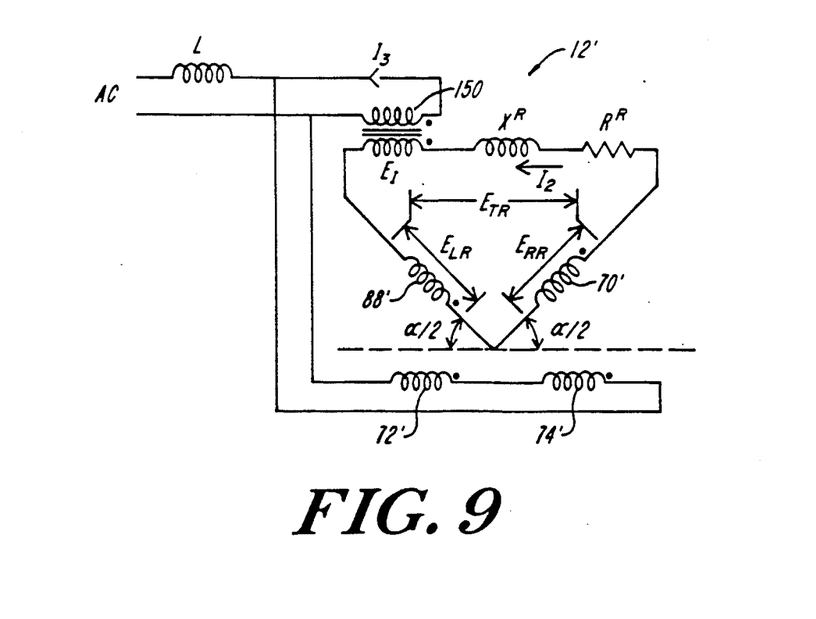
FIG. 9 is a schematic equivalent circuit diagram of the embodiment of the invention of FIG. 8.
Figure 10:
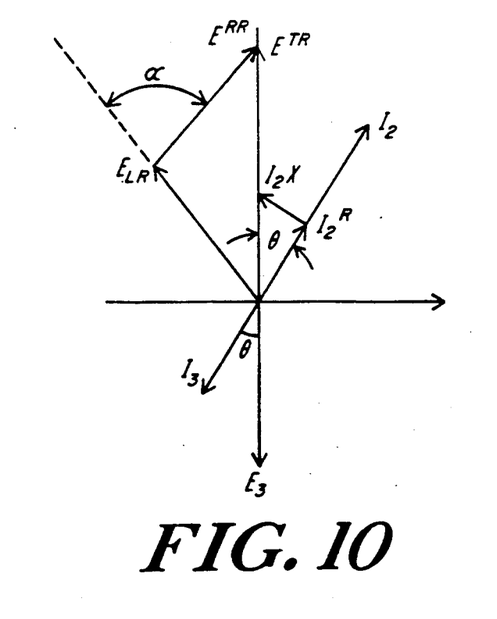
FIG. 10 is a phasor diagram for the embodiment of the invention of FIG. 8.

Referring to FIG. 8, another embodiment of the machine 12 of the invention, which increases its efficiency at reduced speeds, includes a generally conventionally wound third stator 150 connected in parallel with the stator input windings 72', 74' just discussed. This third stator 150 is magnetically coupled to currents in the axial shorting bars 86', connecting the spokes 88' at opposite ends of the rotor. By means of this magnetic coupling to the rotor currents, the third stator 150 extracts electrical energy from the rotor, which would otherwise be dissipated as heat, and feeds it back into the power source. The third stator may be adjustable in angular position relative to stator windings 72', 74' to optimize the coupling of rotor electrical energy into the power source, and thereby maximize machine efficiency. FIG. 9 depicts a schematic equivalent circuit diagram, while FIG. 10 depicts the phasor diagram for the embodiment of FIG. 8. In FIG. 9, $E_{LR}$ and $E_{RR}$ denote the potentials across the spokes 88, and 90, respectively, while $E_{TR}$ is the vector sum of the potentials $E_{LR}$ and $E_{RR}$. $X_R$ is the leakage reactance of the rotor circuit, $R_R$ is the resistance of the rotor circuit and $I_2$ is the current in the rotor. L is the external inductor. $E_1$ is the induced rotor potential and $I_3$ is the current induced in the third stator 150'.

It should also be noted that the machine, in any of the embodiments discussed, can be constructed in single phase configuration or in three-phase or other multiphase configuration.

An output voltage from the voltage controller 104 can also be provided by a split stator machine, such as described above, operating as a generator. Such a generator provides an output voltage of a magnitude which is dependent on the relative angular displacement ο between the stator windings. Such a generator is described in the above-identified copending application.

Figure 11:
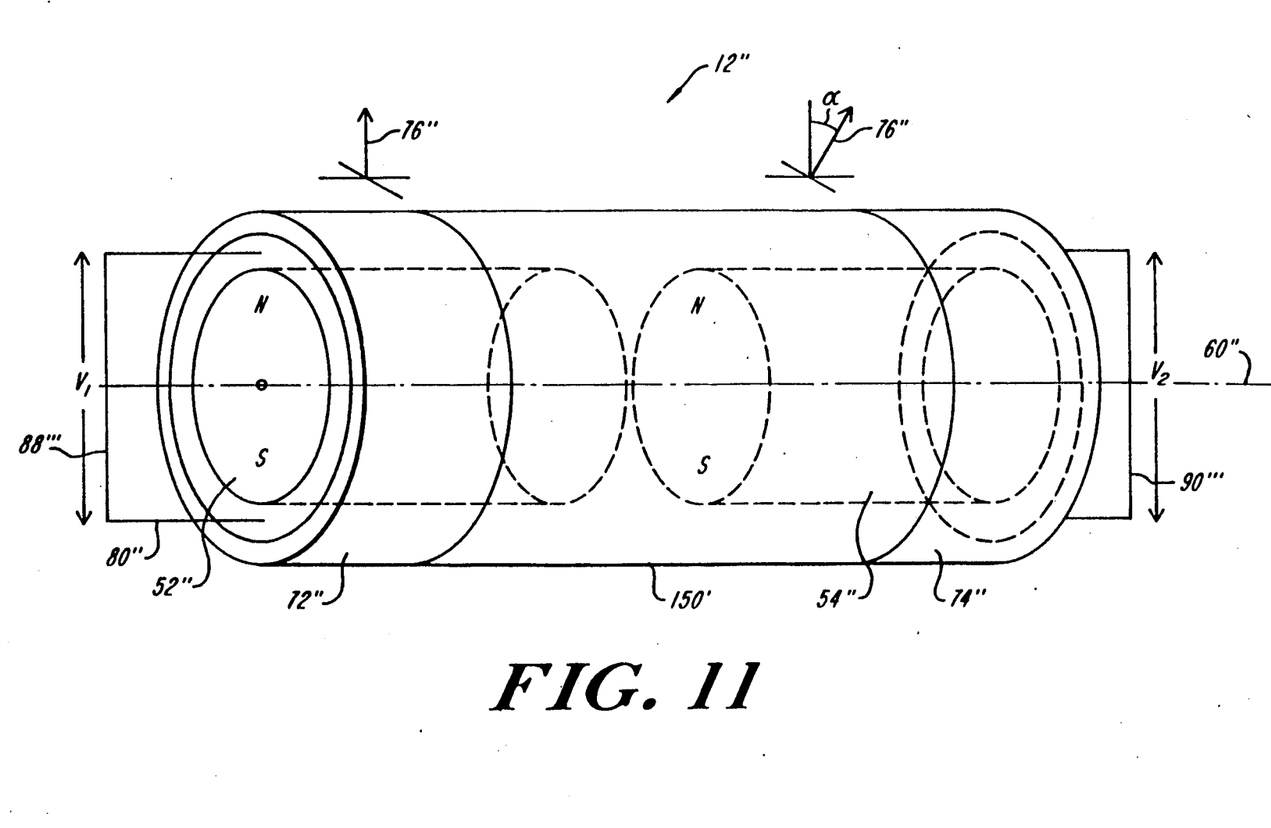
FIG. 11 is a perspective view of another embodiment of the invention.

Finally, it should be noted that although axially directed field machines are depicted in the figures of the preferred embodiments, radially directed field machines are also possible. FIG. 11 depicts such a radially directed field machine. In this embodiment, two cylindrically wound stators 72", 74" are coaxially mounted about two freely rotating permanent magnet field cylinders 52" and 54". A squirrel cage winding 80 occupies the space between the cylinder 52" or 54" and its respective stator 72", 74". The cylindrical stators 72" and 74" are orientated at an angle ο with respect to one another and the field is radially directed. Although the field direction has been changed, the radially directed field machine functions substantially as previously described with regard to the other embodiments. As discussed previously, a third stator 150' may be included in the embodiment to improve its efficiency.

Figure 12:
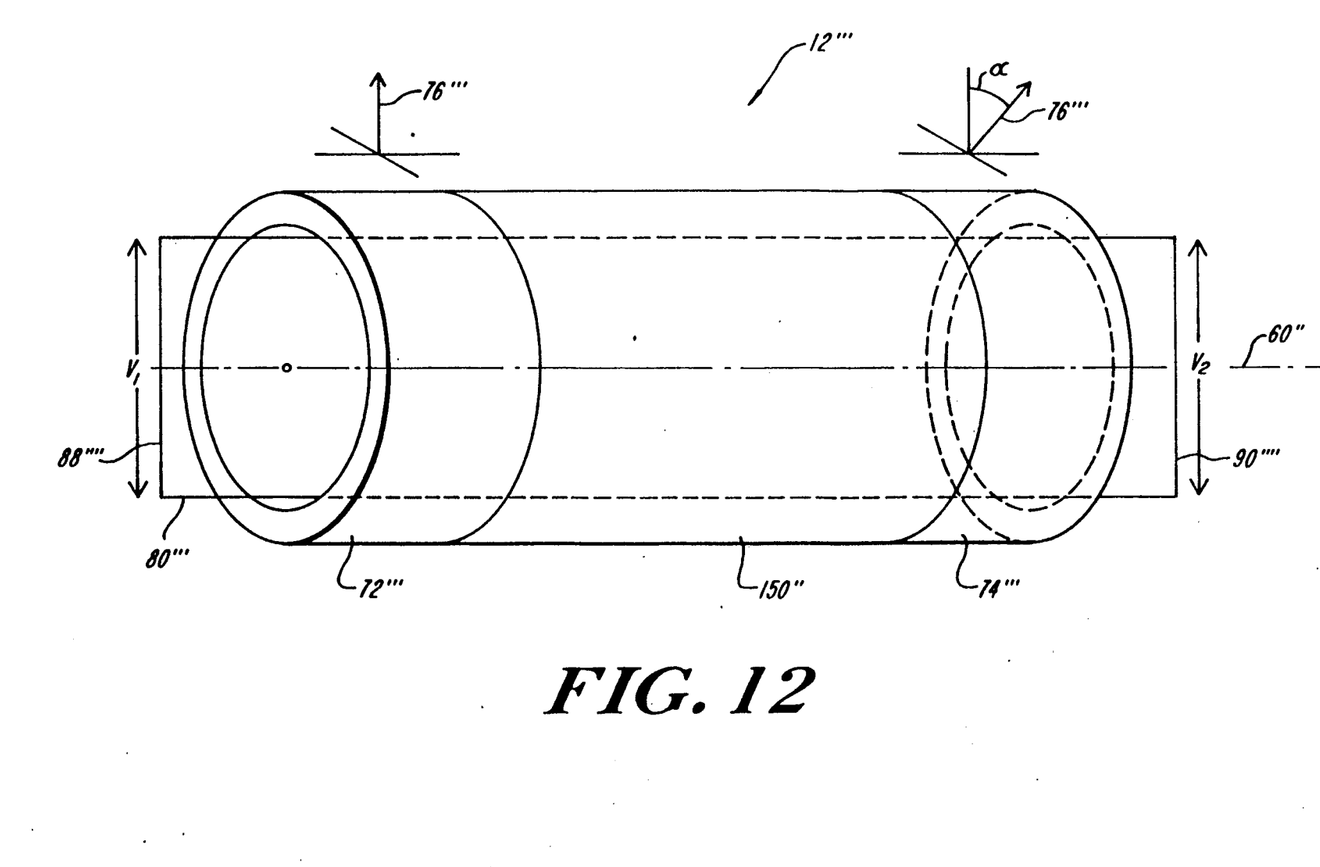
FIG. 12 is a perspective view of another embodiment of the invention.

FIG. 12 depicts another embodiment of a radially directed field machine. In this embodiment, the rotor 80''' is driven by the stators 72''' and 74''' as in a conventional induction motor, that is, without the use of field cylinders 52" and 54". As discussed in the other embodiments, the stators 72''' and 74''' are orientated at an angle α with respect to one another and this angular difference induces the differential voltage within the rotor. Again, a third stator 150" may be included in this embodiment to improve its efficiency.

It is understood that other modifications or embodiments are possible which will still be within the scope of the appended claims. These and other examples of the concept of the invention illustrated above are intended by way of example and the actual scope of the invention is to be determined solely from the following claims.

What is claimed is:

1. An adjustable speed drive system comprising:
   a first pair of field plates freely rotatable about a shaft and providing an axial magnetic field substantially in the direction of the shaft and between the first pair of field plates;
   an input winding disposed between the first pair of field plates;
   a second pair of field plates freely rotatable about the shaft and providing an axial magnetic field substantially in the direction of the shaft and between the second pair of field plates;

a second input winding disposed between the second pair of field plates; and a rotor attached for rotation with the shaft and having windings disposed between each pair of field plates;

the first and second input windings being adapted for connection to an ac source, and being relatively angularly adjustable with respect to each other about the axis of the shaft to provide a predetermined angular orientation of one input winding with respect to the other input winding, the speed of the shaft being a function of the angular orientation between the first and second input windings.

2. The adjustable drive system of claim 1 wherein said stator windings are connected in series.

3. The adjustable drive system of claim 1 wherein said stator windings are connected in parallel.

4. The adjustable speed drive system of claim 1 further comprising a voltage controller connecting the ac supply to the stator windings of the first and second stators and operative to adjust the input voltage to the stator windings to provide an intended power factor.

5. The adjustable speed drive system of claim 4 wherein the voltage controller is operative to provide unity power factor.

6. The adjustable speed drive system of claim 4 wherein the voltage controller comprises an autotransformer.

7. The adjustable speed drive system of claim 4 wherein the voltage controller comprises tapped stator windings.

8. The adjustable speed drive system of claim 4 wherein the voltage controller comprises an induction machine having a rotor assembly mounted on a shaft and first and second stators disposed in operative relation about the rotor assembly, the stators being relatively angularly adjustable with respect to each other about the axis of the shaft; and a drive unit coupled to the shaft and operative to drive the rotor assembly at a predetermined angular speed, the angular orientation of the first and second stators being adjustable to provide an intended output voltage for application to the stator windings of the adjustable speed drive.

9. The adjustable speed drive system of claim 4 further comprising a speed sensor for sensing the angular speed of the shaft; and a controller operative in response to a signal derived from said speed sensor to adjust the angular orientation of the first and second stators to maintain a predetermined shaft speed.

10. The adjustable speed drive system of claim 9 further comprising a start circuit operative to start the machine upon initial application of ac power.

11. An electric motor comprising:

a rotor assembly mounted on a shaft having a long axis and rotatable with the shaft; and a first stator assembly having a stator winding and a second stator assembly having a stator winding, each said stator assembly disposed about different portions of the rotor assembly, each said stator assembly including plural permanent magnets providing axially-directed fields respectively through said different rotor portions, which axially-directed field are substantially parallel to said long axis of said shaft, the first and second stator assemblies being relatively angularly adjustable with respect to each other about the long axis of the shaft to provide an intended phase offset between the axially-directed fields of the first stator with respect to the axially directed fields of the second stator inducing thereby through the different rotor portions torque-producing currents on the shaft, the stator windings of the first and second stators being adapted for connection to an AC supply, the speed of the shaft being a function of the angular orientation between the first and second stators.

12. The electric motor of claims 1 or 11 wherein the rotor assembly comprises squirrel cage windings.

13. An electric rotating machine, comprising:

a shaft;

first and second stators mounted concentrically about said shaft and in axially spaced relation, at least one of said first and second stators being mechanically rotatable about said shaft to provide an intended angular offset between said first and second stators;

first and second permanent assemblies respectively mounted concentrically with said shaft for free rotation thereabout, said first and second permanent magnet assemblies respectively defining first and second annular spaces with said first and second stators; and a rotor assembly concentrically mounted for rotation with said shaft and having portions disposed within said first and second annular spaces defined between said first and second stators and said first and second permanent magnet assemblies.

14. The invention of claim 13, wherein said rotor assembly is a squirrel cage rotor assembly.

15. The invention of claim 13, wherein said first and second permanent magnet assemblies are cylindrically shaped.

16. The invention of claim 13, wherein said first and second stators and said first and second permanent magnet assemblies coact to create a radially-directed magnetic field respectively in said first and second annular spaces.

17. An electric rotating machine, comprising:

a shaft;

first and second stators axially disposed along the shaft and each mounted concentrically about said shaft, at least one of said first and second stators being mechanically rotatable about said shaft to provide an intended angular offset between said first and second stators;

first and second permanent magnet assemblies each mounted with said shaft for rotation thereabout, and respectively each spaced coaxially with a respective one of the first and second stators to define annular spaces between each pair of stators and permanent magnet assemblies; and a rotor assembly concentrically mounted for rotation with said shaft and having portions disposed within said annular spaces.

18. The invention of claim 17, wherein said first and second permanent magnet assemblies are disposed coaxially within respective stators.

* * * * *

UNITED STATES PATENT AND TRADEMARK OFFICE
CERTIFICATE OF CORRECTION

PATENT NO. : 5,200,659
DATED : April 6, 1993
INVENTOR(S) : Patrick W. Clarke

It is certified that error appears in the above-identified patent and that said Letters Patent is hereby corrected as shown below:

In the Abstract, line 1, please delete "is provided which".

Signed and Sealed this

Twenty-second Day of March, 1994

Attest:

BRUCE LEHMAN

*Attesting Officer*   *Commissioner of Patents and Trademarks*